(12) United States Patent
Searle

(10) Patent No.: US 6,683,954 B1
(45) Date of Patent: Jan. 27, 2004

(54) KEY ENCRYPTION USING A CLIENT-UNIQUE ADDITIONAL KEY FOR FRAUD PREVENTION

(75) Inventor: Scott Searle, Kirkland, WA (US)

(73) Assignee: LockStream Corporation, Bellevue, WA (US)

( * ) Notice: Subject to any disclaimer, the term of this patent is extended or adjusted under 35 U.S.C. 154(b) by 0 days.

(21) Appl. No.: 09/425,861

(22) Filed: Oct. 23, 1999

(51) Int. Cl.[7] .............................................. H04L 9/00
(52) U.S. Cl. ............................ 380/30; 380/44; 380/29; 380/281; 380/284
(58) Field of Search ........................ 380/44, 29, 30, 380/281, 284; 705/193; 713/176, 177

(56) References Cited

U.S. PATENT DOCUMENTS

| | | | |
|---|---|---|---|
| 5,337,357 A | 8/1994 | Chou et al. | 380/4 |
| 5,459,488 A | 10/1995 | Geiser | |
| 5,586,186 A | 12/1996 | Yuval et al. | 380/30 |
| 5,694,381 A | 12/1997 | Sako | 369/58 |
| 5,889,860 A * | 3/1999 | Eller et al. | 380/4 |
| 5,905,797 A | 5/1999 | McRae | 380/3 |
| 5,933,497 A | 8/1999 | Beetcher et al. | 380/4 |
| 5,999,629 A * | 12/1999 | Heer et al. | 380/49 |
| 6,005,935 A | 12/1999 | Civanlar et al. | 380/4 |
| 6,157,721 A * | 12/2000 | Shear et al. | 380/255 |
| 6,162,122 A * | 12/2000 | Acres et al. | 463/29 |
| 6,560,339 B1 * | 5/2003 | Iwamura | 380/201 |
| 6,583,806 B2 * | 6/2003 | Ludwig et al. | 348/14.08 |

FOREIGN PATENT DOCUMENTS

| | | | |
|---|---|---|---|
| EP | 0 844 550 A | 5/1998 | G06F/1/00 |
| JP | 10207808 A | 11/1998 | G06F/13/00 |
| WO | WO 98/37483 | 8/1998 | |

OTHER PUBLICATIONS

Marc Abrams and Constantinos Phanouiou, "UIML: An XNL Language for Building Device–Independent User Interfaces" Proceedings of the XML '99 Conference (http://www.harmonia.com/resources/papers/xml199final.pdf).

Yuval et al., Method and System for Controlling Unauthorized Access to Information Distributed to Users, U.S. pat. No. 5,586,186, Dec. 17, 1996.

Eller et al., Encryption System with Transaction–Coded Decryption Key, U.S. pat. No. 5,889,860, Mar. 30, 1999.

*The Format Frenzy In Digital Music*, http://www.washingtonpost.com/wp–srv/business/feed/a3191–1999oct1.htm, (Copyright dated 1999) (3 pages).

* cited by examiner

*Primary Examiner*—Albert Decady
*Assistant Examiner*—Todd Jack
(74) *Attorney, Agent, or Firm*—Patrick J. S. Inouye

(57) ABSTRACT

Encryption of a key using another key that is unique and particular to a given client is disclosed. In one embodiment, a computer-implemented method determines a first key that is unique and particular to the client, without user intervention. In varying embodiments, this key can be one or more of: a processor identifier, a network card address, an IP address, a checksum of a component, a serial number of a hard disk drive, a number of cylinders of a hard disk drive, and a user name in a registry file. At least a second key that provides access to information, such as multimedia information, is encrypted with this first key. The second key as encrypted with the first key may be stored on a storage.

8 Claims, 6 Drawing Sheets

KEY ENCRYPTION USING A CLIENT-UNIQUE ADDITIONAL KEY FOR FRAUD PREVENTION

FIELD OF THE INVENTION

This invention relates generally to encryption and decryption of information, such as multimedia information, accomplished via a key, and more particularly to additional encryption and decryption of the key using a client-unique additional key for fraud prevention.

BACKGROUND OF THE INVENTION

The Internet has become a popular manner by which to purchase multimedia information such as music, a phenomenon that seemingly will only increase over time as more consumers have the ability to connect to the Internet, and as their connections are at greater bandwidths to permit other multimedia information, such as video, to also be easily purchased. While actors, artists and companies responsible for producing and distributing such multimedia information generally applaud new manners of distribution, they are nevertheless somewhat concerned about the Internet and other manners by which digital versions of their content can be distributed. This is because a copy of a digital version of content can easily be duplicated illegally by consumers, potentially decreasing the revenue taken in by the rightful owners of the content.

One solution that has been suggested and used within the prior art is the encryption of multimedia information via known encryption schemes. Usually, and especially in the context of multimedia information purchased by end consumers, the information is encrypted with a key. Knowledge of the key, therefore, is required to decrypt the information; without the key, the encrypted information is unintelligible. Thus, even if many digital copies of a particular song or movie were distributed over the Internet to end users all over the world, unless a given end user knows the key to unlock the encrypted copy, the song or movie is useless.

A barrier to the overall effectiveness of this approach is, however, that little deters a consumer who has purchased encrypted multimedia information from sharing the key provided to him or her with others, or even from posting the key on the Internet along with the encrypted information. While content owners can assign each purchaser of content a unique key, such that illegal distribution of the key can be traced back to the original purchaser, this puts the onus of enforcement on the owners themselves, which will likely be time-consuming and expensive. Furthermore, the owners are put in the uncomfortable position of bringing action against their own customers, which may lead to public relations and other problems where it turns out that the key assigned to a particular consumer was distributed on a large scale through no fault of the consumer—for example, where the key was stolen from the consumer.

A solution to this and other problems is described in the copending, cofiled, and coassigned application Ser. No. 09/425,862 entitled "Encryption Using a User-Known and Personally Valuable Key to Deter Key Sharing,". In this application, the key used for encryption of the information is known to the user and personally valuable to him or her, such as a social security number, driver's license number, credit card number, etc. A user is thus motivated not to share the key with others, since the key itself has personal value to him or her.

However, this solution does not prevent the user from using or copying the information, such as text or multimedia information, on multiple computers or devices owned or accessible by him or her. For example, a user may have a desktop computer, a portable electronic device, and a laptop computer, all of which the user can copy the information to, for use on any such device. However, this may be against the licensing terms to which the user agreed when first purchasing or otherwise obtaining the information. The seller or provider of the information has little recourse in this situation within the prior art.

For these and other reasons, then, there is a need for the present invention.

SUMMARY OF THE INVENTION

The invention provides for encryption of a key using another key that is unique and particular to a given client, such as a desktop computer, a laptop computer, a portable electronic device, etc., for fraud prevention and other purposes. In one embodiment, a computer-implemented method determines a first key that is unique and particular to the client, without user intervention. In varying embodiments of the invention, this key can be one or more of: a processor identifier, a network card address, and a user name in a registry file. The key may also be one or more of: serial numbers and/or the number of cylinders of attached hard disk drives, checksums of the read-only memory (ROM) or other system components, the Internet Protocol (IP) address of the computer or system, and a combination of installed cards, such as sound, video, SCSI, and other cards, as the key. At least a second key that actually provides access to information, such as multimedia information, is then encrypted with this first key. (Other information may also be encrypted with the first key.) The second key as encrypted with the first key may be stored on a storage, such as a non-volatile memory or a hard disk drive.

Embodiments of the invention provides for advantages not found within the prior art. When decryption of the information is desired, in one embodiment, the second key first must be decrypted using the first key. The first key is thus redetermined and used to decrypt the second key. Because the first key is specific to the underlying computer or device, if the encrypted second key is moved to another computer or device, it will not be decrypted successfully. Thus, users are restrained from copying the information to other clients other than that on which they first stored the information, without, for example, reregistering the information with the seller or other provider.

Other embodiments of the invention enhance fraud prevention and security in still other ways. For example, the recording inputs may be varied when multimedia information is played back, so that any illicit recording will result in an undesirable copy of the information. As a further example, various checksums can be determined to ensure that the user has not made illicit changes to the playback software or other playback mechanism, as well as various system checks to detect known piracy programs that may be running on the system. In addition, a server can be contacted, for example, over the Internet, to update the player software or other playback mechanism, as well as the system checks that are to be performed.

The invention includes computer-implemented methods, machine-readable media, computerized systems, and computers of varying scopes. Other aspects, embodiments and advantages of the invention, beyond those described here, will become apparent by reading the detailed description and with reference to the drawings.

DETAILED DESCRIPTION OF THE INVENTION

Figure 1:
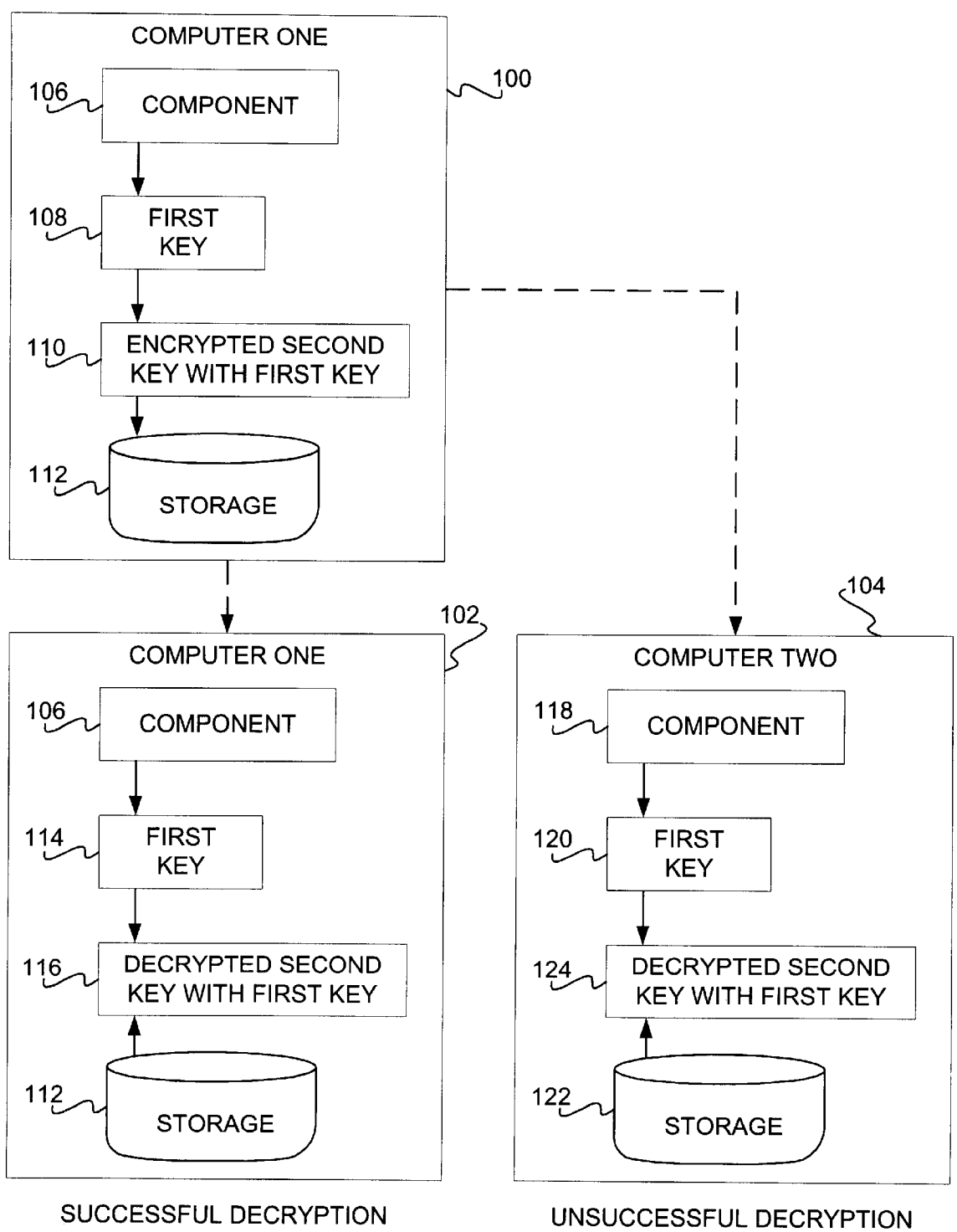
FIG. 1 is a diagram illustrating the operation of an embodiment of the invention.

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as processing or computing or calculating or determining or displaying or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Cryptography Background

In this section of the detailed description, a brief summary of cryptography is presented. Embodiments of the invention are not limited to a particular scheme by which to perform encryption and decryption. Those of ordinary skill within the art can appreciate that many such different schemes exist, and can be used in accordance with embodiments of the invention. One common scheme that can be used by embodiments of the invention, but to which the invention itself is not limited, is known as the Data Encryption Standard, or DES. Other known schemes include, Rivest Cipher #4 (RC4), Rivest Cipher #2 (RC2), SKIPJACK, International Data Encryption Algorithm (IDEA), Blowfish, Twofish, triple DES (3DES), EEE3, EDE3, EEE2, and EDE2.

Cryptography generally is the conversion of data into a secret code, so that, for example, it can be transmitted over a public network, such as the Internet. The original data is converted (encrypted) into a coded equivalent via an encryption algorithm, or scheme. The encrypted data is decoded. (decrypted) at the receiving end and turned back into the original data. The encrypted data is typically unintelligible.

An encryption scheme uses a key, for example, a binary number that is between 40 to 128 bits in length. The data is "locked" for sending by combining the bits in the key mathematically with the data bits. At the receiving end, the key is used to "unlock" the code, restoring it to its original binary form. The particular types of keys that are used by embodiments of the invention are described in a later section of the detailed description. A key used by an encryption or decryption scheme is generally referred to as a code that is combined in some manner with the original data or information to encrypt the data or information for security purposes.

It is noted that in conjunction with embodiments of the invention, a key can be a number, characters, or any combination thereof. That is, where a key is referred to herein as a number, this is one example of what a key can be. Those of ordinary skill within the art can appreciate that the invention is not so limited, and that keys made up of characters, as well as numbers and characters, in addition to just numbers, are also applicable to embodiments of the invention.

Operation of an Embodiment of the Invention

In this section of the detailed description, the operation of one particular embodiment of the invention is described. The invention itself, however, is not limited to the description of this section. The description of this section is made in conjunction with FIG. 1.

FIG. 1 is a diagram showing an encryption 100 situation, a successful decryption 102 situation, and an unsuccessful decryption 104 situation, according to an embodiment of the invention. In the encryption 100, a component 106 of computer one is used to determine a first key 108. The first key 108 is unique and particular to computer one. The component 106 has an identifier such that it can be used to particularly and uniquely identify computer one. That is, the identifier of the component 106 is used as the first key 108, such that the first key 108 is unique and particular to computer one.

The invention is not particularly limited to a given type of component 106. In one embodiment, the component 106 is one or more of the following: a processor that has a unique serial number or other identifier, such as an Intel Pentium III processor having such an identifier; a network card having a unique media access controller (MAC) address; and, in embodiments of the invention utilizing a version of the Microsoft Windows operating system, the user name as saved in a registry file of the operating system. The component may also be one or more of: a hard disk drive having serial numbers and/or a particular number of cylinders, read-only memory (ROM) or other system components (for the providing of checksums thereof), the Internet Protocol (IP) address of the computer or system, and a combination of installed cards, such as sound, video, SCSI, and other cards.

At least a second key that has been used to encrypt information, such as multimedia information, is then encrypted with the first key in 110. For example, the second key may be user-known and personally valuable information, as described in the copending, coassigned, and cofiled patent application Ser. No. 09/425,862 entitled "Encryption Using a User-Known and Personally Valuable Key to Deter Key Sharing,". In that case, information, such as text information or multimedia information such as video, audio, music, and image information, is encrypted using a key that is user known and personally valuable, such as a credit card number or a driver's license number. Thus, in 110, this key is encrypted using the first key 108, which is unique and particular to computer one as based on an identifier of the component 106 that uniquely and particularly identifies computer one. The encrypted second key is stored on the storage 112, which can be a non-volatile memory such as a flash memory, or a hard disk drive, etc. The invention is not limited to a particular type of storage 112.

In one embodiment of the invention, more information than just the second key is encrypted using the first key. For example, user identification, server addresses, playback information, program configuration, etc., may be configured, in addition to the second key.

The statement that the second key is encrypted using a first key uniquely and particularly identifying computer one (which can be referred to as the client computer) is now described. Those of ordinary skill within the art understand that encryption is typically performed by a key that is any number of bits in length, such as between 40 and 128 bits in length. Each bit is either a 1 or a 0. The statement that information is encrypted using a key as described in the previous paragraphs means that the ultimate key used in the encryption scheme is based on information that particularly and uniquely identifies the client computer. It does not mean that the key literally has to be such information, but that the key is based on that information in some manner—i.e., derived from such information.

For example, using the identifier of the component 106 that uniquely and particularly identifies computer one as a starting point, embodiments of the invention can convert or otherwise manipulate this information to produce the actual key as may be required by the encryption scheme being used. Each character of the identifier, for instance, may be converted into an eight-bit binary number, the conversions of all such characters concatenated together, and every second or third bit selected until the needed number of bits to make the actual key has been obtained. This is only one example, however, and the invention is not so limited. Thus, when it is stated that information that particularly and uniquely identifies a client computer is used as a key, those of ordinary skill within the art can appreciate that this is shorthand for stating that such information is used as a starting point from which the actual key used by an encryption scheme is derived.

The usefulness of such a key is described in relation to the successful decryption 102 situation, also performed on computer one, and to the unsuccessful decryption 104 situation, performed on a different computer, computer two. In the successful decryption 104 situation, the same component 106 is used to regenerate the first key 114 that was generated as the first key 108 in the encryption 100. Because the same component 106 is being used, the first key 114 regenerated in the successful decryption 102 situation is identical to the first key 108 that was initially generated during the encryption 100 situation. Thus, when the encrypted second key is retrieved from the storage 112, it will be successfully decrypted in 116.

However, in the unsuccessful decryption 104 situation, it is presumed that the encrypted second key was copied from the storage of computer one to a storage of computer two—the storage 122 of FIG. 1. Thus, the component 118 used to regenerate the first key 120 will not be the identical to the component 106 used to generate the first key 108 during encryption. It may have a different serial number, address, or other identifier that is used to particularly and uniquely identifier its computer, which in this case is computer two. Therefore, when the encrypted second key is retrieved from the storage 122, and the regenerated first key is used to decrypt the second key in 124, the decryption will be unsuccessful—because the first key 120 used for decryption necessarily varies from the first key 108 used for encryption, since the first keys are particular and unique to their respective client computers, computer one and computer two, respectively.

Therefore, using a first key to encrypt at least a second key, where the first key is unique and particular to the client computer, controls the distributed use of the second key. The second key as encrypted with the first key may be freely copied to other computers and similar such devices, but it will not be successfully decrypted unless it is decrypted on the computer or similar such device on which it was originally encrypted. In the case of information encrypted with the second key that was purchased by the user of the client computer, this ensures that the user will not be able to copy and use the information on other computers or similar such devices that he or she owns or uses, without the permission and knowledge of the seller of the information. The user may copy the information to other computers freely, but because the first key is unique and particular to the computer on which the second key was encrypted, these other computers will not able to decrypt the second key with their own first keys.

Methods

In this section of the detailed description, methods according to varying embodiments of the invention are described. It is noted that these methods can be computer-implemented. Furthermore, the methods can be realized at least in part as one or more programs, or parts thereof, each having a number of instructions, running on a computer or other such device—that is, as a program executed from a machine- or a computer-readable medium such as a memory by a processor of a computer or other such device. The programs are desirably storable on a machine-readable medium such as a compact flash memory, floppy disk or a CD-ROM, for distribution and installation and execution on another computer.

Figure 2:
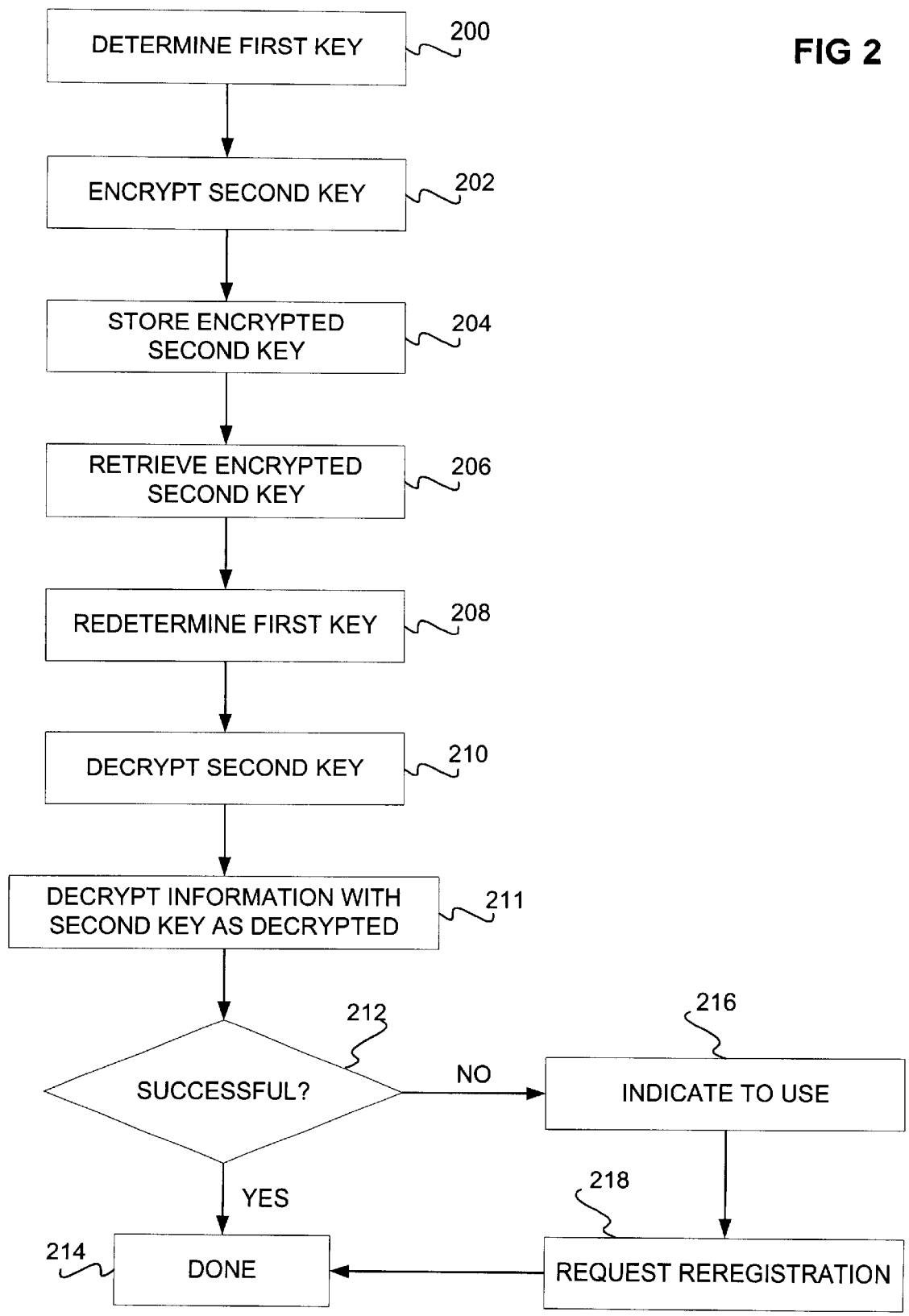
FIG. 2 is a flowchart of a method according to an embodiment of the invention.

Referring to FIG. 2, a flowchart of one method according to an embodiment of the invention is shown. In 200, a first key that is unique and particular to a client is determined, without user intervention. The first key is unique and particular to the client in that it particularly and uniquely identifies the client as compared to other clients. The client is any type of computer or other such device, as is described in a proceeding section of the detailed description. The first key may be one or more of: a processor identifier, a network card address, and a user name in a registry file, as described in the preceding section of the detailed description. The key may also be one or more of: serial numbers and/or the number of cylinders of attached hard disk drives, checksums of the read-only memory (ROM) or other system component's, the Internet Protocol (IP) address of the computer or system, and a combination of installed cards, such as sound, video, SCSI, and other cards, as the key. The first key is not limited to any of these, however. The first key is determined without user intervention in that the first key is not based on input made by the user—that is, the first key is determined with respect to information already contained within the client, such as based on a component thereof, as described in a preceding section of the detailed description (although the invention itself is not so limited).

In 202, at least a second key is encrypted with the first key. The second key may be used to encrypt information such as multimedia information, as described in the preceding section of the detailed description. In 204, the encrypted second key is stored on a storage, such as a non-volatile memory, or a hard disk drive, etc. The invention is not particularly limited to a given type of storage.

In one embodiment of the invention, more information than just the second key is encrypted using the first key. For example, user identification, server addresses, playback information, program configuration, etc., may be configured, in addition to the second key.

In 206, the encrypted second key is retrieved from the storage, and in 208, the first key is redetermined. If the redetermination of the first key in 208 is performed on the same client as the determination of the first key in 200 was performed, then the redetermined first key in 208 will be identical to the originally determined first key in 200 (assuming that the component used to generate the first key in 200 has not changed or been modified). However, if the encrypted second key was stored on a different client, such that the redetermination in 208 is performed on a different client, then the first key redetermined in 208 will be different than the first key originally determined in 200. In 210, the second key is attempted to be decrypted based on the first key redetermined in 208.

In 212, if the second key was decrypted successfully—that is, if the first key redetermined in 208 was the same as the first key originally determined in 200—then the method proceeds to 214, and the method is done. However, if the second key was not decrypted successfully—that is, if the first key redetermined in 208 was not identical to the first key originally determined in 200—then the method proceeds instead to 216, and the user is notified that the decryption was unsuccessful. In 218, in one embodiment of the invention, the user is requested to reregister the first key with a registering authority. For example, the user may be asked to reregister a purchase of the information that was encrypted with the second key with the seller of the information, by logging onto the seller's web site. The method then proceeds to 214, where it is finished.

It is noted that the invention itself is not limited to the particular embodiment just recited. For example, in some cases, the user may not be notified of unsuccessful decryption. For example, new information may be requested without explaining that any error has occurred, or a web server may automatically be logged onto. Furthermore, in the case of failed decryption, playback or other access to the information may be completely disabled, or allowed only in a limited capacity, without any error notification.

Representative Computer or Other Such Device

In this section of the detailed description, a representative computer or other such device in conjunction with which embodiments of the invention may be practiced, and one or more of which can act as a client or a server as referred to in the previous sections of the detailed description, is described. However, the invention is not limited to the representative computer or other such device described herein. The phrase "other such device" is used to reflect the fact that devices other than computers can be used in accordance with embodiments of the invention—for example, PDA devices and MP3 devices, although the invention is not limited to an other such device particularly recited herein.

Figure 3:
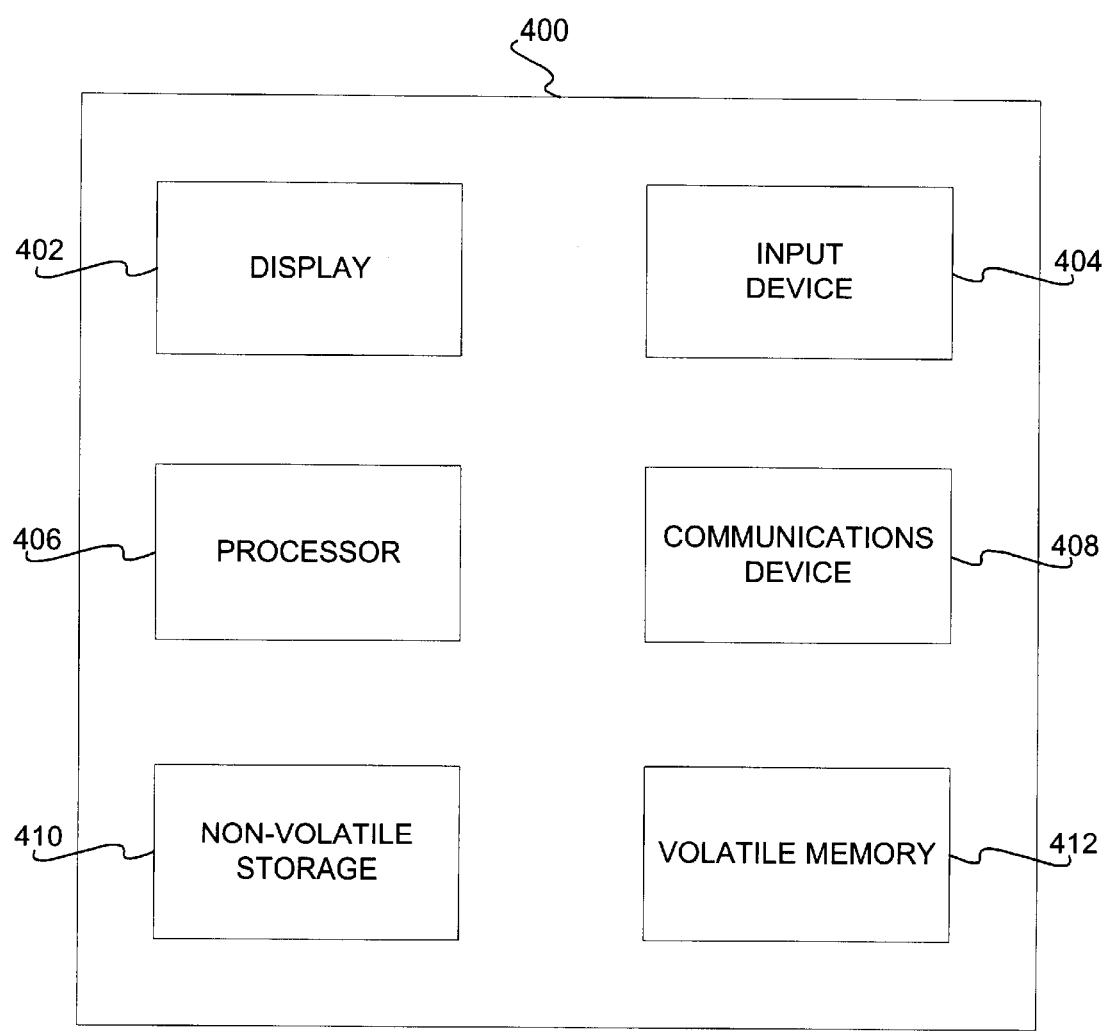
FIG. 3 is a block diagram of a representative computer or computerized device in conjunction with which embodiments of the invention may be practiced.

The computer or other such device is shown in block diagram form in FIG. 3. The computer or other such device 400 desirably includes one or more of desirably but not necessarily each of the following components. The display 402 can include a flatpanel display, such as a liquid crystal display (LCD), or a cathode-ray tube (CRT) display. The input device 404 can include a keyboard, a pointing device such as a mouse, trackball or touch pad, a touch screen, one or more buttons, etc. The processor 406 executes instructions implementing methods of varying embodiments of the invention. In one embodiment, the processor 406 can be considered the means to perform a method according to an embodiment of the invention. The communications device 408 can be used to communicate with another computer or other such device—to communicate with a client, for example, in the case of a server, and vice-versa. The device 408 may be a network adapter, a modem, a wireless transceiver, etc. The non-volatile storage 410 can include a hard disk drive, and/or non-volatile memory such as flash and compact flash memory, such as in the form of memory cards. The volatile memory 412 typically includes a version of dynamic random-access memory (DRAM), as known within the art.

Other Embodiments to Promote Fraud Prevention and Security

In this section of the detailed description, additional embodiments of the invention are described designed for promoting security and fraud prevention. Three particular additional embodiments are described: a checksum embodiment in conjunction with FIG. 4, a piracy signature detection embodiment in conjunction with FIG. 5, and a recording inputs variance embodiment in conjunction with FIG. 6. Each of these is now described in turn.

Figure 4:
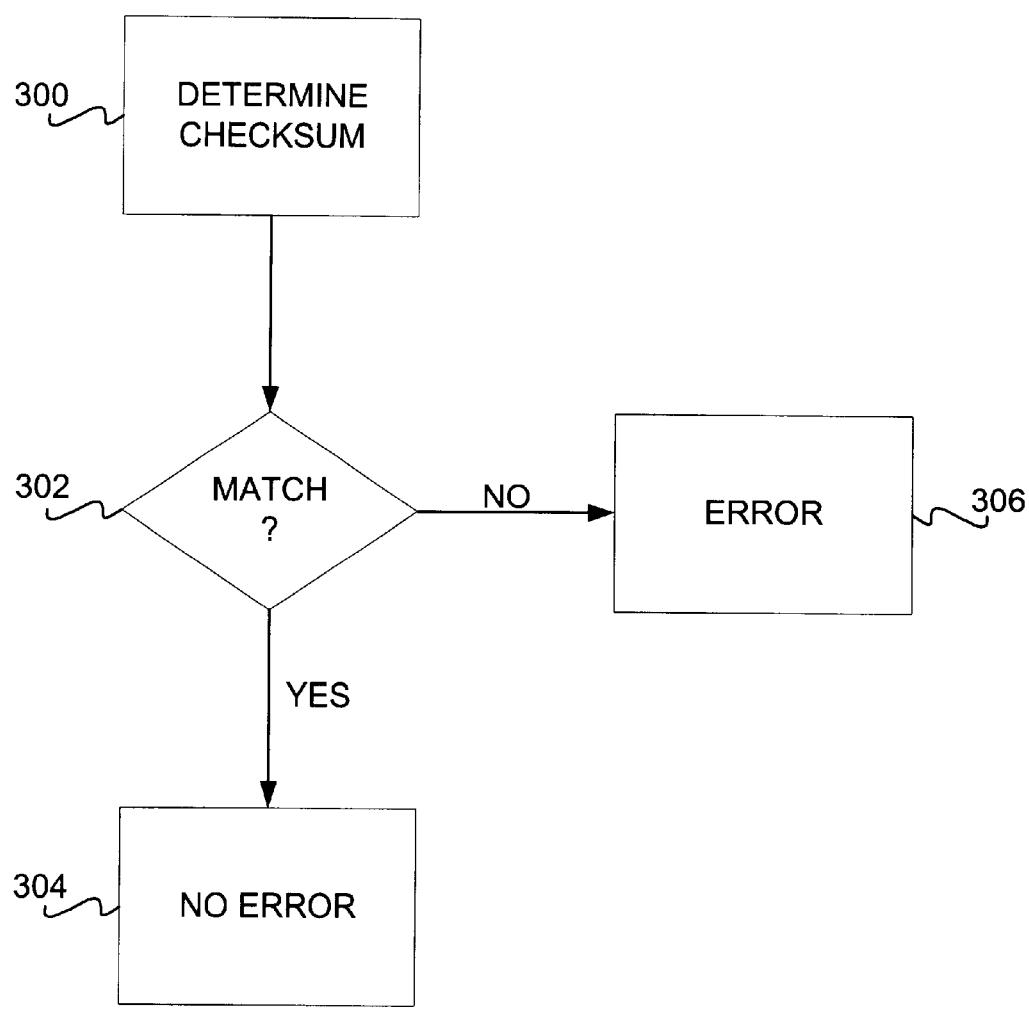
FIG. 4 is a flowchart of a checksum verification method according to an embodiment of the invention.

Referring first to FIG. 4, a flowchart of a method of a checksum embodiment of the invention is shown. In 300, a checksum is determined for a player of information, the information itself, or both. The player can be a viewer for text information, or a player for multimedia information such as audio, music, video and image information. That is, the player can be playback software for the information. The information itself can be any type of information, such as text information or multimedia information. Still other information amenable to embodiments of the invention includes software programs, such as the electronic distribution thereof. The checksum is a value known within the art, and is a value used to ensure that data is stored or transmitted without modification. It is created in one embodiment by calculating the binary values in the data using an algorithm (the specific type of which the invention is not particularly limited to), and storing the results with the data, where the data in this case is the player of the information, the information itself, or both. Thus, the player and/or the information already have a predetermined checksum target value associated therewith.

In 302, it is determined whether the checksum determined in 300 matches the checksum target value. A non-match indicates that the player, the information, or both, have been modified. Because such modification may indicate that the player, the information, or both have been changed for piracy or other fraudulent purposes, the information will not be played back or otherwise allowed to be accessed if such a non-match occurs. In this situation, the method proceeds from 304 to 306, and a checksum error is indicated. Otherwise, the method proceeds from 302 to 304, where the method is finished.

In one particular embodiment, a checksum is stored in a data block that also contains the second key, as the second key has been described in preceding sections of the detailed description. The checksum is determined from the unencrypted version of the data block in this embodiment, before it is encrypted with the first key and stored. Thus, this provides for easy determination as to whether the block has been decrypted successfully. If the checksum matches the newly calculated checksum, then the block has been reconstructed successfully. Furthermore, if the data block has been modified while encrypted, this is also able to be detected, because the checksums will not match.

Figure 5:
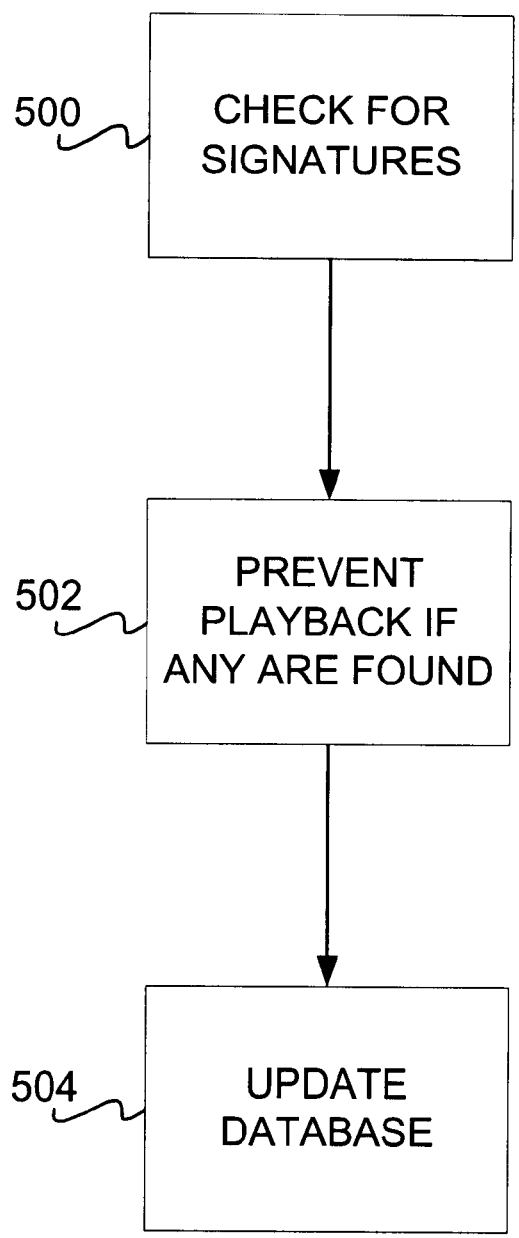
FIG. 5 is a flowchart of a piracy-signature detection method according to an embodiment of the invention; and, FIG. 6 is a diagram illustrating the manner by which recording inputs can be dynamically varied during multimedia information playback to thwart piracy in accordance with an embodiment of the invention.

Referring next to FIG. 5, a flowchart of a method of a piracy signature detection embodiment of the invention is shown. In 500, one or more system indicators are each checked against a signature database of known piracy mechanism. Each of the system indicators in one embodiment is an operating system file, such as those typically saved in the windows subdirectory of the root hard drive in computers running versions of the Microsoft Windows operating system. However, the invention is not so limited. Other system indicators include the boot sectors of the root hard drive, as known within the art, as well as various places within the memory of the client. The signature database contains information regarding the binary patterns of the machine code of a particular known piracy mechanism, such as a computer program or a virus (although the invention is not particularly limited to either as a piracy mechanism) meant to encourage piracy of software and/or other information, such as text and multimedia information. Thus, the database of piracy patterns is compared with existing files and other system indicators to determine if a piracy mechanism is present. If such a piracy mechanism is present in any of the system indicators, then playback of the information is prevented in 502. Furthermore, in 504, the signature database can be periodically updated so that it remains current, and is able to detect new piracy mechanisms, for example, by downloading a new database or an update file from a web site.

In one particular embodiment, detection of a modification or piracy mechanism is reported to the user. However, the invention is not so limited. In other embodiments of the invention, detection may result in the disabling of playback or other access to the underlying information; notification of a server that piracy or other modification mechanisms have been found; and/or, modification of the player, the information, or other files that are present on the system to prevent them from being used at all, or to cause them to function only in a limited capacity (e.g., playing music at a reduced quality level, or playing only 20% of a song). In another embodiment, at least one of these actions also occurs if the first key does not successfully decrypt the second key, as described in preceding sections of the detailed description.

The invention is not particularly limited to the manner by which the signatures of the piracy or other modification mechanisms are determined. In one embodiment, however, a signature includes a checksum of the offending piracy or other modification mechanism. This provides for easy detection of the mechanism.

Figure 6:
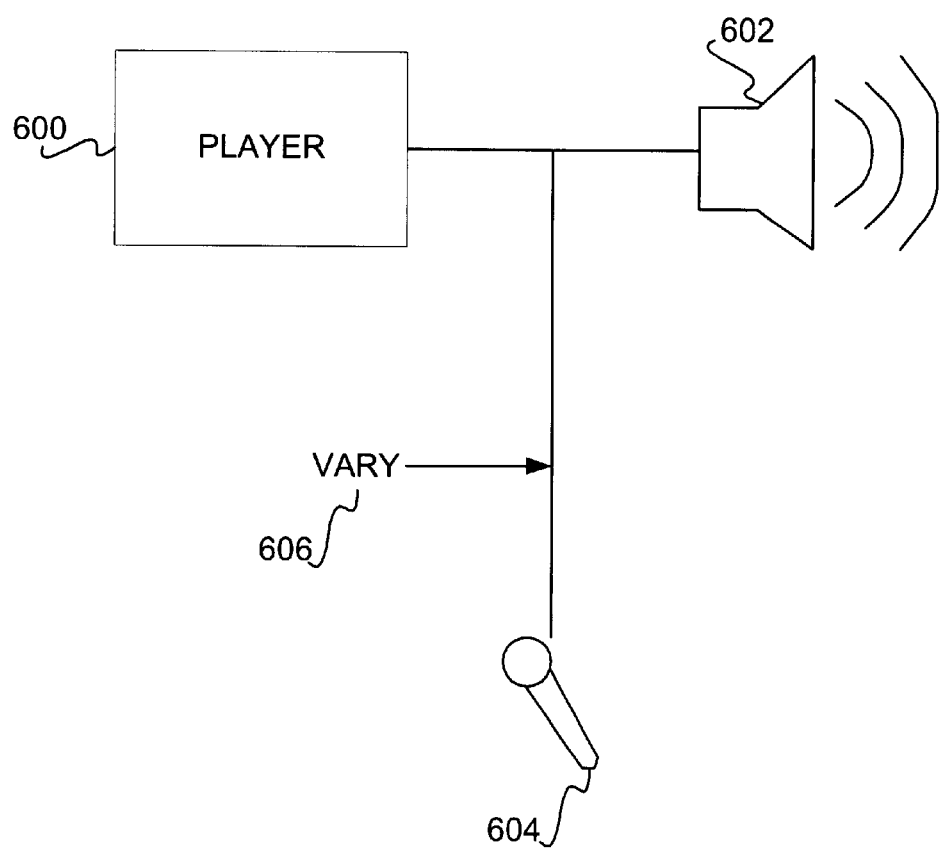

Referring finally to FIG. 6, a diagram of a recording inputs variance embodiment of the invention is shown. The player 600 is in one embodiment playback software for playing back information of a predetermined type, such as multimedia information like audio and video information. When the player 600 plays back the information, the information is sent over outputs, such as audio or video outputs, via the operating system, so that it can be heard on a speaker 602, in the case of audio information, for example, or another output actuation device, such as a display in the case of video information. In some operating systems, such as versions of the Microsoft Windows operating system, the information is also output such that it can be received by recording inputs, so that it can also be recorded by a recording device, as represented by the microphone 604 in FIG. 6 (although the invention is not limited to such a recording device).

Therefore, to prevent unauthorized recording of information that is being played back for output on an output actuation device, the levels of the recording inputs, such as the volume level of the recording inputs or other levels, are varied during playback, as represented by 606 in FIG. 6. This results in an unsatisfactory recording. While the information may still be present on the recording, the volume level may be constantly changing, for example, such that the recording is essentially useless. As another example, in the case of video multimedia information, the color levels may be constantly changing, such that the picture is still recognizable, but of unsatisfactory condition. The means for varying the recording inputs in one embodiment of the invention can be considered a computer program, which may also by the computer program that is responsible for playing back the information itself (for example, the player 600).

In other embodiments of the invention, other outputs and/or inputs are varied instead of or in addition to the recording inputs, in order to prevent unauthorized recording of information that is being played back for output on an output actuation device. Furthermore, in one embodiment of the invention, such outputs and/or inputs, such as the recording inputs, are muted. The term varying the volume level is inclusive of muting, however.

Conclusion

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefore, it is manifestly intended that this invention be limited only by the following claims and equivalents thereof.

I claim:

1. A computer-implemented method for a client, comprising:

determining a first key unique and particular to the client without user intervention;

encrypting at least a second key with the first key;

storing the second key as encrypted with the first key on a storage;

retrieving the second key as encrypted with the first key from the storage;

redetermining the first key;

decrypting the second key with the first key as redetermined;

determining whether decrypting the second key was successful; and upon determining that decrypting the second key was unsuccessful, indicating so to the user and requesting that the user reregister the first key with a registering authority.

2. The method of claim 1, wherein the first key comprises at least one of: a processor identifier, a network card address, an IP address, a checksum of a component, a serial number of a hard disk drive, a number of cylinders of a hard disk drive, and a user name in a registry file.

3. A computer-implemented method for a client comprising:

determining a first key unique and particular to the client without user intervention;

encrypting at least a second key with the first key;

storing the second key as encrypted with the first key on a storage;

retrieving the second key as encrypted with the first key from the storage;

redetermining the first key;

decrypting the second key with the first key as redetermined;

determining whether decrypting the second key was successful; and upon determining that decrypting the second key was unsuccessful, indicating so to the user; and upon determining that decrypting the information was unsuccessful, requesting that the user reregister the first key with a registering authority.

4. The method of claim 3, wherein the first key comprises at least one of: a processor identifier, a network card address, an IP address, a checksum of a component, a serial number of a hard disk drive, a number of cylinders of a hard disk drive, and a user name in a registry file.

5. A machine-readable medium having instructions stored thereon for execution by a processor of a client to perform a method comprising:

determining a first key unique and particular to the client without user intervention;

encrypting at least a second key with the first key;

storing the second key as encrypted with the first key on a storage;

retrieving the second key as encrypted with the first key from the storage;

redetermining the first key;

decrypting the second key with the first key as redetermined;

determining whether decrypting the second key was successful; and upon determining that decrypting the second key was unsuccessful, indicating so to the user and requesting that the user reregister the first key with a registering authority.

6. The medium of claim 5, wherein the first key comprises at least one of: a processor identifier, a network card address, an IP address, a checksum of a component, a serial number of a hard disk drive, a number of cylinders of a hard disk drive, and a user name in a registry file.

7. An apparatus comprising;

a storage;

at least one component having an identifier particularly and uniquely identifying the apparatus; and means for:

determining a first key from the identifier;

encrypting at least a second key with the first key; and, storing the second key as encrypted on the storage, wherein the means is further for retrieving the second key as encrypted from the storage and redetermining the first key from the identifier; and decrypting the second key with the first key as redetermined, wherein the means is further for determining whether decrypting the second key was successful and wherein the means is further for, upon determining that decrypting the second key was unsuccessful, indicating so to the user and requesting that the user reregister the first key with a registering authority.

8. The apparatus of claim 7, wherein the at least one component comprises at least one of: a hard disk drive, a processor, a network card, and a registry file.

* * * * *